(12) United States Patent
McDonald et al.

(10) Patent No.: US 10,782,471 B2
(45) Date of Patent: Sep. 22, 2020

(54) WIRELESS CONTROL DEVICE ASSEMBLY

(71) Applicant: Lutron Technology Company LLC, Coopersburg, PA (US)

(72) Inventors: Matthew P. McDonald, Phoenixville, PA (US); Joseph M. Nichols, Boyertown, PA (US); Andrew P. Schmalz, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 54 days.

(21) Appl. No.: 15/966,709

(22) Filed: Apr. 30, 2018

(65) Prior Publication Data

US 2018/0246273 A1 Aug. 30, 2018

Related U.S. Application Data

(63) Continuation of application No. 14/737,724, filed on Jun. 12, 2015, now Pat. No. 9,958,602.

(60) Provisional application No. 62/011,881, filed on Jun. 13, 2014.

(51) Int. Cl.
*H01Q 1/36* (2006.01)
*F21V 8/00* (2006.01)
*H05B 47/19* (2020.01)

(52) U.S. Cl.
CPC ........... *G02B 6/0096* (2013.01); *G02B 6/002* (2013.01); *G02B 6/0018* (2013.01); *H05B 47/19* (2020.01)

(58) Field of Classification Search
CPC .. F21V 29/004; F21V 21/0832; F21V 23/003; F21V 33/0008; F21Y 2101/02; H01J 61/327; H01J 19/36; H01J 61/52; H01J 25/70; H01J 25/52; H01J 25/58; H01J 19/02; A61B 5/0091; F21S 6/008; H03B 9/01; H01Q 11/08; H01Q 1/362; H01Q 1/36; H01Q 1/38; H01Q 9/27
See application file for complete search history.

(56) References Cited

U.S. PATENT DOCUMENTS

| | | |
|---|---|---|
| 4,917,577 A | 4/1990 | Furudate |
| 5,584,556 A | 12/1996 | Yokoyama et al. |
| 6,074,069 A | 6/2000 | Chao-Ching et al. |
| 6,211,828 B1 | 4/2001 | Krylov et al. |
| 6,435,690 B1 | 8/2002 | Till |

(Continued)

*Primary Examiner* — Minh D A
(74) *Attorney, Agent, or Firm* — Glen Farbanish; Philip Smith; Amy Yanek

(57) ABSTRACT

A control device, such as a gateway device for a wireless load control system, has a light bar extending around a periphery of an enclosure to provide feedback to a user of the load control system, as well as to provide a pleasing aesthetic effect on the gateway device. The control device may include at least one light-emitting diode mounted to a printed circuit board inside the enclosure, a control circuit mounted to the printed circuit board and operatively coupled to the light-emitting diode for controllably illuminating the light-emitting diode, and a multi-functional mounting structure for mounting the printed circuit board inside the enclosure. The mounting structure may have at least one light-pipe structure for conducting light from the at least one light-emitting diode to the light bar. The mounting structure may have an antenna-mounting structure to which an antenna of the control device may be mounted.

16 Claims, 7 Drawing Sheets

(56) References Cited

U.S. PATENT DOCUMENTS

| | | | |
|---|---|---|---|
| 7,486,241 B2 * | 2/2009 | Qi | H01Q 1/2275 |
| | | | 343/702 |
| 7,566,138 B2 | 7/2009 | Inoue | |
| 7,670,039 B2 | 3/2010 | Altonen et al. | |
| 7,791,595 B2 | 9/2010 | Altonen et al. | |
| 7,938,562 B2 | 5/2011 | Ivey et al. | |
| 8,608,359 B2 | 12/2013 | Kataoka et al. | |
| 2005/0104786 A1 * | 5/2005 | Kim | H01Q 1/242 |
| | | | 343/702 |
| 2007/0007353 A1 * | 1/2007 | Danielson | G06K 7/10881 |
| | | | 235/462.46 |
| 2012/0265272 A1 * | 10/2012 | Judkins | A61N 1/37223 |
| | | | 607/60 |
| 2013/0335280 A1 * | 12/2013 | Chen, III | H01Q 21/28 |
| | | | 343/725 |
| 2014/0125463 A1 | 5/2014 | Carmen, Jr. et al. | |
| 2014/0246981 A1 | 9/2014 | McDonald et al. | |
| 2014/0268628 A1 | 9/2014 | Mann et al. | |

* cited by examiner

WIRELESS CONTROL DEVICE ASSEMBLY

CROSS-REFERENCE TO RELATED APPLICATIONS

This application is a continuation of U.S. patent Publication Ser. No. 14/737,724, filed Jun. 12, 2015, now U.S. Pat. No. 9,958,602, issued May 1, 2018, which claims the benefit of commonly-assigned U.S. Provisional Application No. 62/011,881, filed Jun. 13, 2014, entitled WIRELESS CONTROL DEVICE ASSEMBLY, the entire disclosures of which are hereby incorporated by reference.

BACKGROUND

Field of the Disclosure

The present disclosure relates to a load control system for controlling the amount of power delivered to an electrical load, and more particularly, to a gateway or bridge device for a load control system.

Description of the Related Art

Home automation systems, which have become increasing popular, may be used by homeowners to integrate and control multiple electrical and/or electronic devices in their house. For example, a homeowner may connect appliances, lights, blinds, thermostats, cable or satellite boxes, security systems, telecommunication systems, and the like to each other via a wireless network. The homeowner may control these devices using a controller or user interface provided via a phone, a tablet, a computer, and the like directly connected to the network or remotely connected via the Internet. These devices may communicate with each other and the controller to, for example, improve their efficiency, their convenience, and/or their usability.

Many home automation systems require a gateway or bridge device to connect the wireless network to the Internet. For example, if the wireless network uses a different protocol than an Internet protocol (IP), the gateway device may convert digital messages between the two protocols. The gateway device may comprise two radio-frequency (RF) communication circuits for communicating digital messages via the wireless network and for communicating IP messages via the Internet (e.g., using Wi-Fi technology). In addition, the gateway device may comprise one or more electrical connectors, such as Ethernet connectors, to allow the gateway device to communicate digital messages via the Internet on a wired digital communication link (e.g., an Ethernet link).

While a gateway device is an important component of the home automation system, a user of the home automation system typically does not often physically interact with the gateway device. Therefore, it is desirable to make the gateway device small so that the gateway device does not take up much space in the user's home. It is also desirable for the gateway device to have an attractive appearance so that the gateway device does not become an eyesore in the user's home.

SUMMARY

As described herein, a control device, such as a gateway device for a wireless load control system, may have a light bar extending around a periphery of an enclosure to provide feedback to a user of the load control system, as well as to provide a pleasing aesthetic effect on the gateway device. The control device may comprise: a printed circuit board; an enclosure for housing the printed circuit board; a light-emitting diode mounted to the printed circuit board; and a light-pipe structure located adjacent to a side of the enclosure and configured to form the light bar so that the light bar extends in a lateral direction along the side of the enclosure. The light-emitting diode may be mounted to the printed circuit board adjacent to an edge of the printed circuit board. The light-pipe structure may be configured to conduct light from the at least one light-emitting diode in the lateral direction along the side of the enclosure to generate the light bar.

In addition, the control device may also comprise a multi-functional mounting structure located inside the enclosure. The multi-functional mounting structure may be mechanically coupled between the enclosure and the printed circuit board for mounting the printed circuit board inside the enclosure. The light-pipe structure may be formed as part of the multi-functional mounting structure. The control device may also comprise an antenna for transmitting and receiving wireless signals, and a wireless communication circuit coupled to the antenna for transmitting and receiving the wireless signals. The multi-functional mounting structure may have an antenna-mounting structure to which the antenna is mounted.

DETAILED DESCRIPTION

Figure 1:
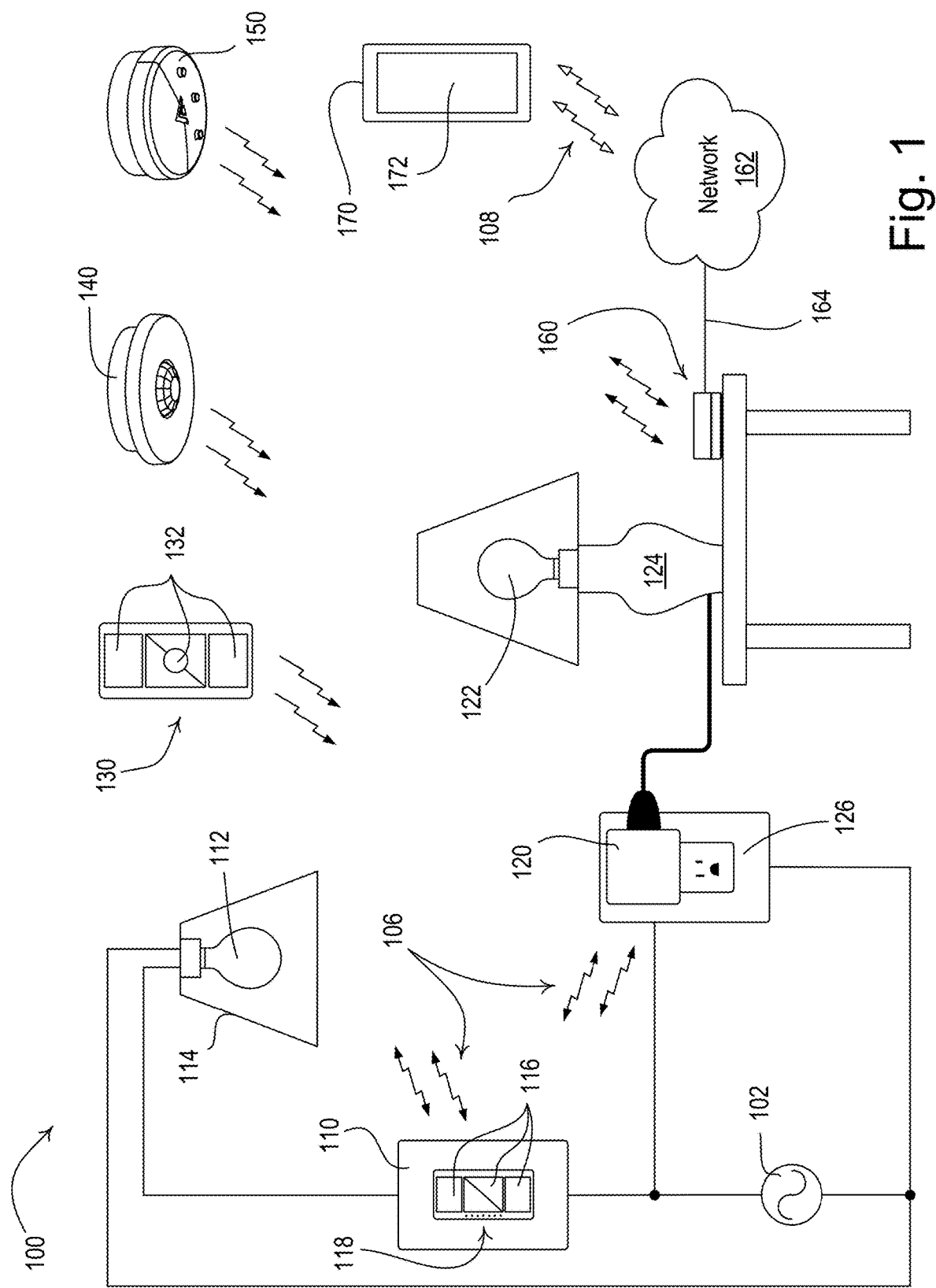
FIG. 1 is a simple diagram of an example load control system for controlling one or more electrical loads.

FIG. 1 is a simple diagram of an example load control system 100 (e.g., a lighting control system) for controlling the amount of power delivered from an alternating-current (AC) power source to one or more electrical loads. The load control system 100 may comprise a first load control device, e.g., a wall-mounted dimmer switch 110, coupled in series electrical connection between the AC power source 102 and a first lighting load, e.g., a first light bulb 112 installed in a ceiling mounted downlight fixture 114. In addition, the first light bulb 112 may be installed in a wall-mounted or other lighting fixture mounted to another surface. The dimmer switch 110 may be adapted to be wall-mounted in a standard electrical wallbox. The load control system 100 may also comprise a second load control device, e.g., a plug-in load control device 120, coupled in series electrical connection between the AC power source 102 and a second lighting load, e.g., a second light bulb 122 installed in a lamp (e.g., a table lamp 124). Specifically, the plug-in load control device 120 may be plugged into an electrical receptacle 126 that is powered by the AC power source 102 and the table lamp 124 is plugged into the plug-in load control device. Alternatively, the second light bulb 122 may be installed in a table lamp or other lamp that may be plugged into the plug-in load control device 120. The plug-in load control device 120 may also be implemented as a table-top load control device or a remotely-mounted load control device.

The dimmer switch 110 may comprise a plurality of actuators 116 (e.g., buttons) for controlling the light bulb 112. In response to actuation of the actuators 116, the dimmer switch 110 may turn the light bulb 112 on and off, and increase or decrease the amount of power delivered to the light bulb and thus increase or decrease the intensity of the light bulb from a minimum intensity (e.g., approximately 1%) to a maximum intensity (e.g., approximately 100%). The dimmer switch 110 may further comprise a plurality of visual indicators 118, e.g., light-emitting diodes (LEDs), arranged in a linear array and illuminated to provide feedback of the intensity of the light bulb 112. Examples of wall-mounted dimmer switches are described in greater detail in U.S. Pat. No. 5,248,919, issued Sep. 29, 1993, entitled LIGHTING CONTROL DEVICE, and U.S. patent application Ser. No. 13/780,514, filed Feb. 28, 2013, entitled WIRELESS LOAD CONTROL DEVICE, the entire disclosures of which are hereby incorporated by reference.

The load control system 100 may further comprise one or more input devices, e.g., RF transmitters, such as a battery-powered remote control device 130, an occupancy sensor 140, or a daylight sensor 150. The dimmer switch 110 and the plug-in load control device 120 may both configured to receive digital messages via wireless signals, e.g., radio-frequency (RF) signals 106, transmitted by the battery-powered remote control device 130, an occupancy sensor 140, or a daylight sensor 150. The dimmer switch 110 and the plug-in load control device 120 may each be configured to turn the respective light bulb 112, 122 on and off, and to increase or decrease the intensity of the respective light bulb in response to the received digital messages. The dimmer switch 110 and the plug-in load control device 120 may both alternatively be implemented as electronic switching devices configured to only turn on and off the respective light bulbs 112, 122.

The remote control device 130 may comprise one or more actuators 132 (e.g., one or more of an on button, an off button, a raise button, a lower button, and a preset button). The remote control device 130 may be a handheld remote control. The remote control device 130 may also be mounted vertically to a wall or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 12, 2012, entitled CONTROL DEVICE HAVING A NIGHTLIGHT, the entire disclosures of which are hereby incorporated by reference.

The remote control device 130 may transmit RF signals 106 in response to actuations of one or more of the actuators 132. All digital messages transmitted by the remote control device 110 may include a command and identifying information, for example, a serial number (e.g., a unique identifier) associated with the remote control device. The remote control device 130 may be assigned to the dimmer switch 110 and/or the plug-in load control device 120 during a configuration procedure of the load control system 100, such that the dimmer switch 110 and/or the plug-in load control device 120 are responsive to digital messages transmitted by the remote control device 130 via the RF signals 106. For example, the RF signals 106 may be transmitted using a proprietary RF protocol, such as the ClearConnect® protocol. Examples of methods of associating wireless control devices are described in greater detail in commonly-assigned U.S. Patent Application Publication No. 2008/0111491, published May 15, 2008, entitled RADIO-FREQUENCY LIGHTING CONTROL SYSTEM, and U.S. Patent Application Publication No. 2013/0214609, published Aug. 22, 2013, entitled TWO-PART LOAD CONTROL SYSTEM MOUNTABLE TO A SINGLE ELECTRICAL WALLBOX, the entire disclosures of which are hereby incorporated by reference.

The occupancy sensor 140 may be configured to detect occupancy and vacancy conditions in the space in which the load control system 100 is installed. The occupancy sensor 140 may transmit digital messages to the dimmer switch 110 and/or the plug-in load control device 120 via the RF signals 106 in response to detecting the occupancy or vacancy conditions. The dimmer switch 110 and/or the plug-in load control device 120 may each be configured to turn on the respective light bulb 112, 122 in response to receiving an occupied command, and to turn off the respective light bulb in response to receiving a vacant command. Alternatively, the occupancy sensor 140 may operate as a vacancy sensor to only turn off the lighting loads in response to detecting a vacancy condition (e.g., to not turn on the light bulbs 112, 122 in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 150 may be configured to measure a total light intensity in the space in which the load control system is installed. The daylight sensor 150 may transmit digital messages including the measured light intensity to the dimmer switch 110 and/or the plug-in load control device 120 via the RF signals 106 for controlling the intensities of the respective light bulbs 112, 122 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control system 100 may further comprise a gateway device 160 (e.g., a bridge) configured to enable communication with a network 162, e.g., a wireless or wired local area network (LAN). The gateway device 160 may be connected to a router (not shown) via a wired digital communication link 164 (e.g., an Ethernet communication link). The router may allow for communication with the network 162, e.g., for access to the Internet. Alternatively, the gateway device 160 may be wirelessly connected to the network 162, e.g., using WiFi technology. An example of the gateway device 100 is described in greater detail in commonly-assigned U.S. Patent Application Publication No. 2014/0052783, published Feb. 20, 2014, entitled WIRELESS BRIDGE FOR FACILITATING COMMUNICATION BETWEEN DIFFERENT NETWORK, and U.S. patent application Ser. No. 14/578,602, filed Dec. 22, 2014, entitled WIRELESS LOAD CONTROL SYSTEM, the entire disclosures of which are hereby incorporated by reference.

The gateway device 160 may be configured to transmit RF signals 106 to the dimmer switch 110 and/or the plug-in load control device 120 (e.g., using the proprietary protocol) for controlling the respective light bulbs 112, 122 in response to digital messages received from external devices via the network 162. The gateway 160 may be configured to receive RF signals 106 from the dimmer switch 110, the plug-in load control device 120, the remote control device 130, the occupancy sensor 140, and/or the daylight sensor 150 (e.g., using the proprietary protocol), and to transmit digital messages via the network 162 for providing data (e.g., status information) to external devices. The gateway device 160 may operate as a central controller for the load control system 100, or may simply relay digital messages between the control devices of the load control system and the network 162.

The load control system 100 may further comprise a network device 170, such as, a smart phone (e.g., an iPhone® smart phone, an Android® smart phone, or a Blackberry® smart phone), a personal computer, a laptop, a wireless-capable media device (e.g., MP3 player, gaming device, or television), or a tablet device, (e.g., an iPad® hand-held computing device), a Wi-Fi or wireless-communication-capable television, or any other suitable Internet-Protocol-enabled device. The network device 170 may be operable to transmit digital messages in one or more Internet Protocol packets to the gateway device 160 via RF signals 108 either directly or via the network 162. For example, the network device 170 may transmit the RF signals 108 to the gateway device 160 via a Wi-Fi communication link, a Wi-MAX communications link, a Bluetooth® communications link, a near field communication (NFC) link, a cellular communications link, a television white space (TVWS) communication link, or any combination thereof. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The network device 170 may have a visual display 172, which may comprise a touch screen having, for example, a capacitive touch pad displaced overtop the visual display, such that the visual display may display soft buttons that may be actuated by a user. The network device 170 may comprise a plurality of hard buttons, e.g., physical buttons (not shown), in addition to the visual display 172. The network device 170 may download a product control application for allowing a user of the network device to control the lighting control system 100. In response to actuations of the displayed soft buttons or hard buttons, the network device 170 may transmit digital messages to the gateway device 160 through the wireless communications described herein. The network device 170 may transmit digital messages to the gateway device 160 via the RF signals 108 for controlling the dimmer switch 110 and/or the plug-in load control device 120. The gateway 160 may be configured to transmit RF signals 108 to the network device 170 in response to digital messages received from the dimmer switch 110, the plug-in load control device 120, the remote control device 130, the occupancy sensor 140, and/or the daylight sensor 150 (e.g., using the proprietary protocol) for displaying data (e.g., status information) on the visual display 172 of the network device.

The operation of the load control system 100 may be programmed and configured using the network device 170. An example of a configuration procedure for a wireless load control system is described in greater detail in commonly-assigned U.S. patent application Ser. No. 13/830,237, filed Mar. 14, 2013, entitled COMMISSIONING LOAD CONTROL SYSTEMS, the entire disclosure of which is hereby incorporated by reference.

The gateway device 160 may also be configured to transmit digital messages to the dimmer switch 110 and/or the plug-in load control device 120 for controlling the respective light bulbs 112, 122 according to a timeclock schedule, which may be stored in a memory in the gateway device. The timeclock schedule may include a number of timeclock events, each having an event time and a corresponding command or preset. The gateway device 160 may be configured to keep track of the present time and day and to transmit the appropriate command or preset at the respective event time of each timeclock event.

The gateway device 160 may be configured to obtain the present time and date from the Internet via the network 162, e.g., by communicating with a time server, such as, the National Institute of Standards and Technology server, which has a Domain Name System (DNS) address of time.nst.gov. For example, the gateway device 160 may obtain the present time and date when the gateway device is first powered on or reset, and may re-synchronize the time and day periodically, e.g., each night. The gateway device 160 may also be configured to obtain the present time and date from the network device 170. For example, the network device 170 may be configured to transmit the present time and date to the gateway device 160 via the RF signals 108 whenever a user logs into the product control application running on the network device.

The gateway device 160 may not have a battery backup for maintaining the present time and date, but may re-synchronize the present time and date as discussed above. If the gateway device 160 "loses" the present time and date, the gateway device is configured to disable the timeclock schedule. For example, the gateway device 160 may lose the present time and date if the connection to the Internet via the network 162 is not available and the gateway device 160 is reset. When the gateway device 160 is able to obtain the present time and date once again (e.g., via the Internet or the network device 170), the gateway device is configured to enable the timeclock schedule.

The load control system 100 may comprise one or more other types of load control devices, such as, for example, a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

In addition, the load control system 100 may comprise other types of input device, such as, for example, temperature sensors, humidity sensors, radiometers, cloudy-day sensors, pressure sensors, smoke detectors, carbon monoxide detectors, air-quality sensors, motion sensors, security sensors, proximity sensors, fixture sensors, partition sensors, keypads, kinetic or solar-powered remote controls, key fobs, cell phones, smart phones, tablets, personal digital assistants, personal computers, laptops, timeclocks, audio-visual controls, safety devices, power monitoring devices (such as power meters, energy meters, utility submeters, utility rate meters), central control transmitters, residential, commercial, or industrial controllers, or any combination of these input devices.

Figure 2:
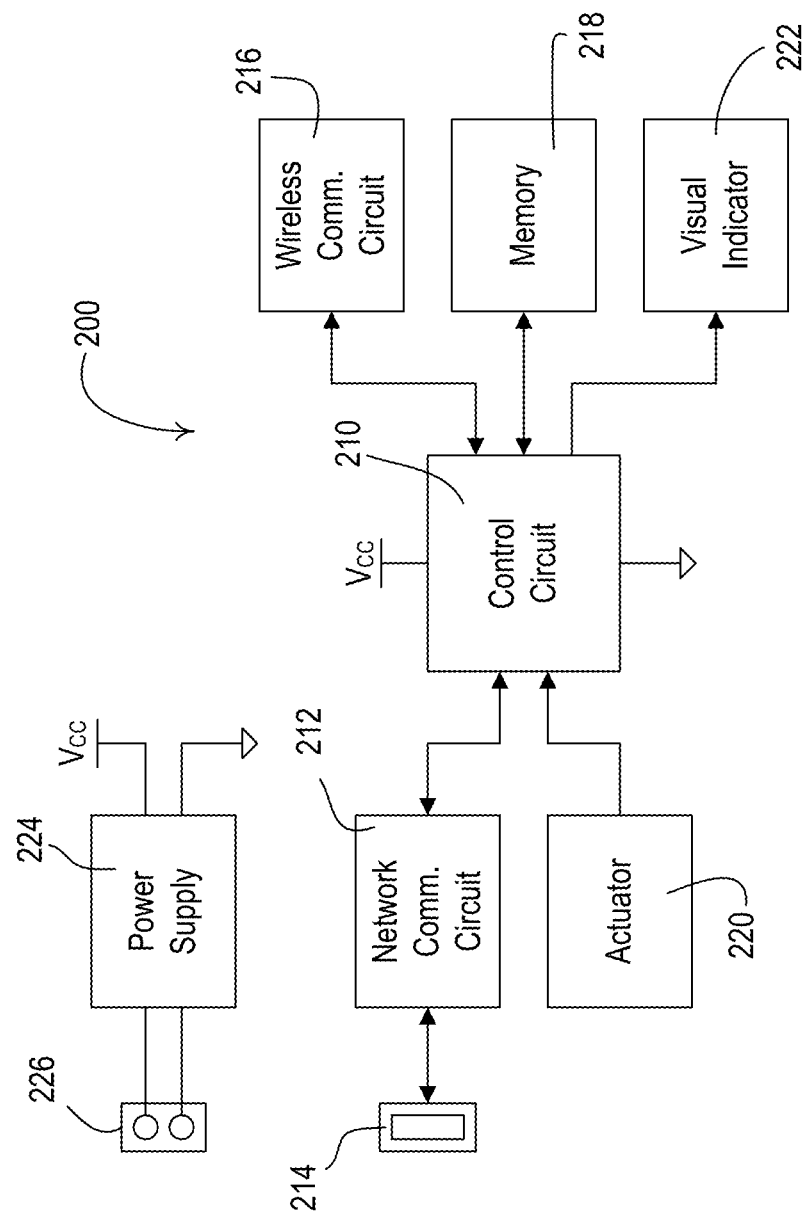
FIG. 2 is a simplified block diagram of an example wireless control device.

FIG. 2 is a simplified block diagram of an example wireless control device, e.g., a gateway device 200, which may be deployed as, for example, the gateway device 160 of the load control system 100 shown in FIG. 1. The gateway device 200 may comprise a control circuit 210, which may include one or more of a processor (e.g., a microprocessor), a microcontroller, a programmable logic device (PLD), a field programmable gate array (FPGA), an application specific integrated circuit (ASIC), or any suitable processing device. The gateway device 200 may comprise a network communication circuit 212 coupled to a network connector 214 (e.g., an Ethernet jack), which is adapted to be connected to a wired digital communication link (e.g., an Ethernet communication link) for allowing the control circuit 210 to communicate with network devices on a network (e.g., a local area network, such as the network 162 shown in FIG. 1). Alternatively, the network communication circuit 212 may be configured to be wirelessly connected to the network, e.g., using WiFi technology to transmit and receive RF signals (e.g., the RF signals 108 shown in FIG. 1).

The gateway device 200 may further comprise a wireless communication circuit 216, for example, including an RF transceiver coupled to an antenna for transmitting and receiving RF signals (e.g., the RF signals 106 shown in FIG. 2) using a proprietary protocol (e.g., the ClearConnect® protocol). The control circuit 210 may be coupled to the wireless communication circuit 216 for transmitting digital messages via the RF signals 106, for example, to control the dimmer switch 110 and/or the plug-in load control device 120 in response to digital messages received via the network communication circuit 212. The control circuit 210 may also be configured to receive digital messages from, for example, the dimmer switch 110, the plug-in load control device 120, the remote control device 130, the occupancy sensor 140, and/or the daylight sensor 150. For example, the control circuit 210 may be configured to receive a digital message including the intensity of a lighting load (e.g., one of the light bulbs 112, 122 of the load control system 100 shown in FIG. 1), and to transmit a digital message including the intensity of the lighting load to the network device 170 for displaying the intensity on the visual display 172.

The control circuit 210 may be coupled to a memory 218 for storage of operational characteristics of the gateway device 200 and/or the load control system 100. The memory 218 may be implemented as an external integrated circuit (IC) or as an internal circuit of the control circuit 210. The control circuit 210 may be responsive to an actuator 220 for receiving a user input. For example, the control circuit 210 may be operable to associate the gateway device 210 with one or more control devices of the load control system 100 in response to actuations of the actuator 220 during a configuration procedure of the load control system. The control circuit 210 may store the serial numbers of the control devices to which the gateway device 200 is associated in the memory 218. The gateway device 200 may comprise additional actuators to which the control circuit 210 is responsive.

The control circuit 210 may be operable to illuminate a visual indicator 222 to provide feedback to a user of the load control system. For example, the control circuit 210 may blink or strobe the visual indicator 222 to indicate a fault condition. In addition, the control circuit 210 may be operable to illuminate the visual indicator 222 different colors to indicator different conditions or states of the gateway device 200. The visual indicator 220 may be illuminated by, for example, one or more light-emitting diodes (LEDs). Alternatively, the gateway device 200 may comprise additional visual indicators.

The gateway device 200 may further comprise a power supply 224 for generating a DC supply voltage $V_{CC}$ for powering the control circuit 210, the network communication circuit 212, the wireless communication circuit 216, the memory 218, and other circuitry of the gateway device. The power supply 224 may be coupled to a power supply connector 226 (e.g., a USB port) for receiving a supply voltage (e.g., a DC voltage) and for drawing current from an external power source.

Figure 3:
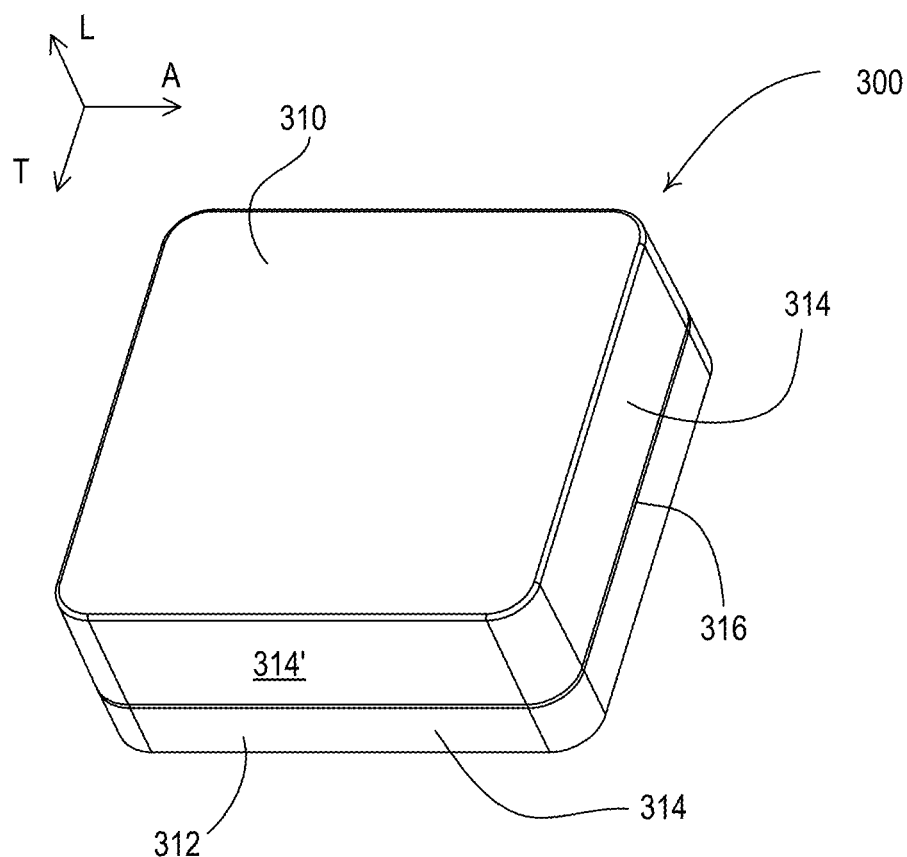
FIG. 3 is a perspective view of an example wireless control device.
Figure 4:
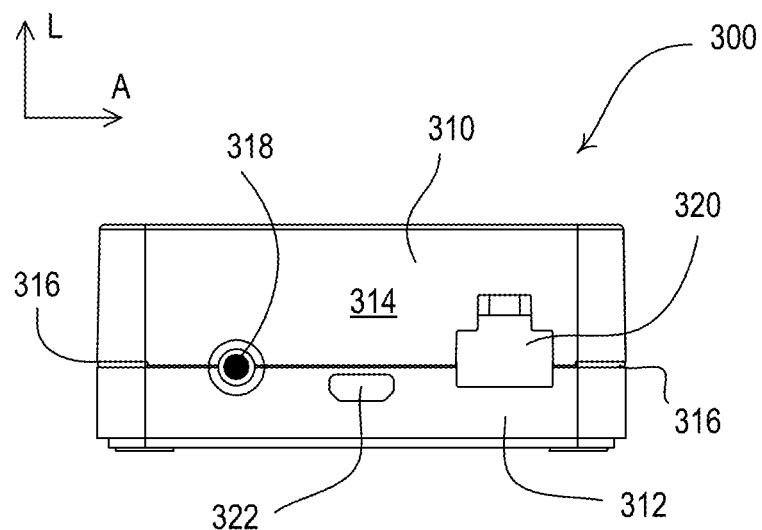
FIG. 4 is a rear view of the wireless control device of FIG. 3.

FIG. 3 is a perspective view and FIG. 4 is a rear view of an example wireless control device, e.g., a gateway device 300, which may be deployed as, for example, the gateway device 160 of FIG. 1 or the gateway device 200 of FIG. 2. The gateway device 300 may comprise an enclosure having an upper portion 310 and a lower portion 312. The enclosure may have a rectangular shape with four substantially planar sides 314 (e.g., each having a length of approximately 2.75 inches). The gateway device 300 may further comprise a visual indicator, e.g., a light bar 316, extending around the periphery of the enclosure between the upper portion 310 and the lower portion 312. For example, the light bar 316 may extend in a lateral direction A along a front side 314' of the enclosure as shown in FIG. 3. The light bar 316 may extend in a transverse direction T along the two sides 314 of the enclosure that are adjacent to the first side 314'. The gateway device 300 may be configured to illuminate the light bar 316 to provide feedback to a user of the load control system of the gateway device (e.g., as the control circuit 210 illuminates the visual indicator 222), as well as to provide a pleasing aesthetic effect on the gateway device.

The gateway device 300 may be configured to transmit and receive wireless signals (e.g., the RF signals 106 shown in FIG. 1) with control devices of a load control system (e.g., the load control system of FIG. 1). The gateway device 300 may comprise an actuator 318 (e.g., the actuator 220 of the gateway device 200 of FIG. 2) that may be actuated, for example, to associate the gateway device with the control devices of the load control system. The gateway device 300 may comprise a network connector 320 (e.g., an Ethernet jack, such as the network connector 214 of the gateway device 200 of FIG. 2) for allowing the gateway device 300 to be connected to a network (e.g., the network 162). The gateway device 300 may further comprise a power supply connector 322 (e.g., a USB port, such as the power supply connector 226 of the gateway device 200 of FIG. 2) adapted to be coupled to an external power source for powering the gateway device 300.

Figure 5:
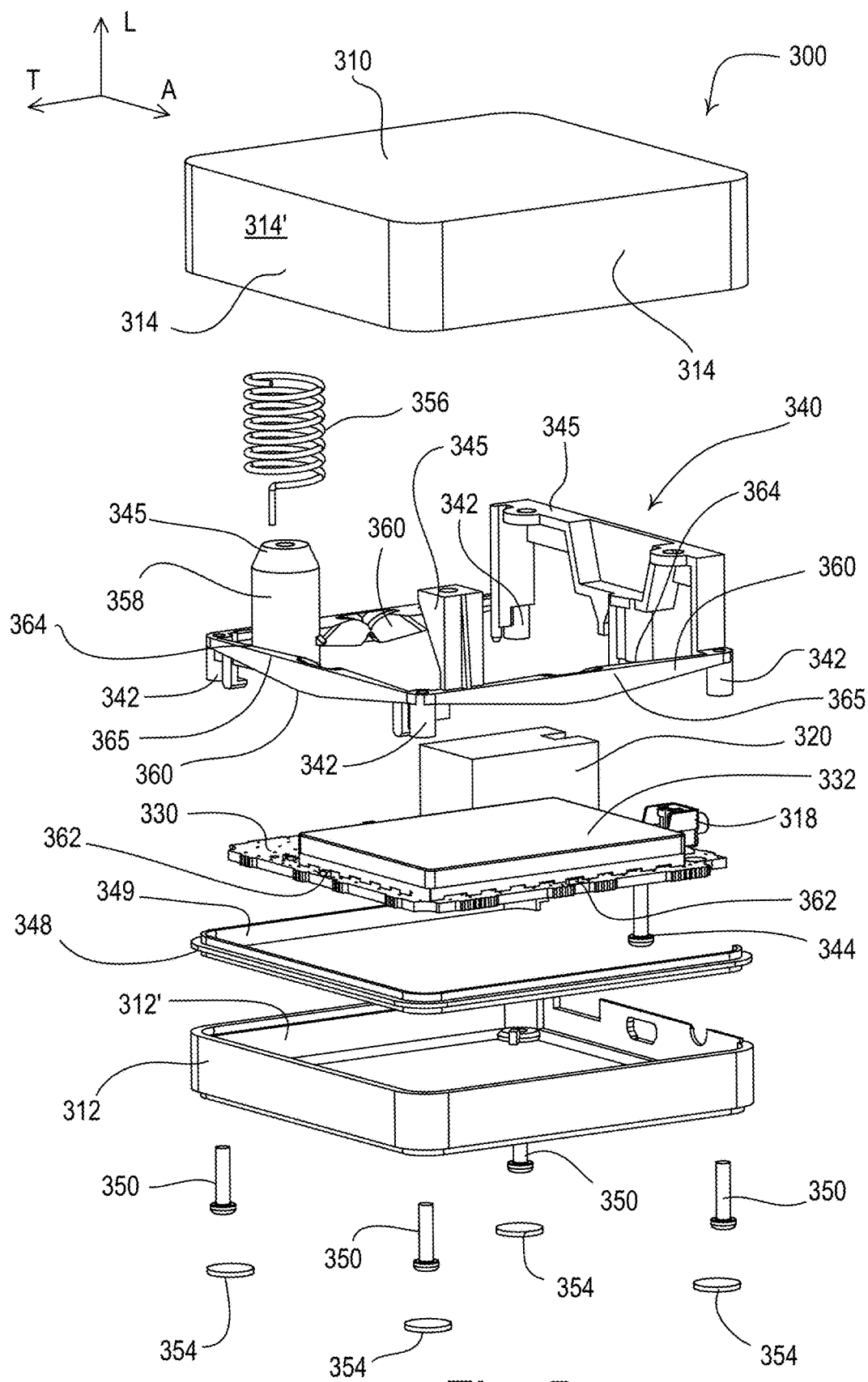
FIG. 5 is an exploded perspective view of the wireless control device of FIG. 3.

FIG. 5 is an exploded perspective view of the gateway device 300. The gateway device 300 may comprise a printed circuit board (PCB) 330 on which the electrical circuitry of the gateway device may be mounted (e.g., the electrical circuitry shown in FIG. 2). The actuator 318, the network connector 320, and the power supply connector 322 may be mounted to the printed circuit board 330. The gateway device 300 may include an RF shield 332 surrounding most of the electrical circuitry on the printed circuit board 330.

Figure 6:
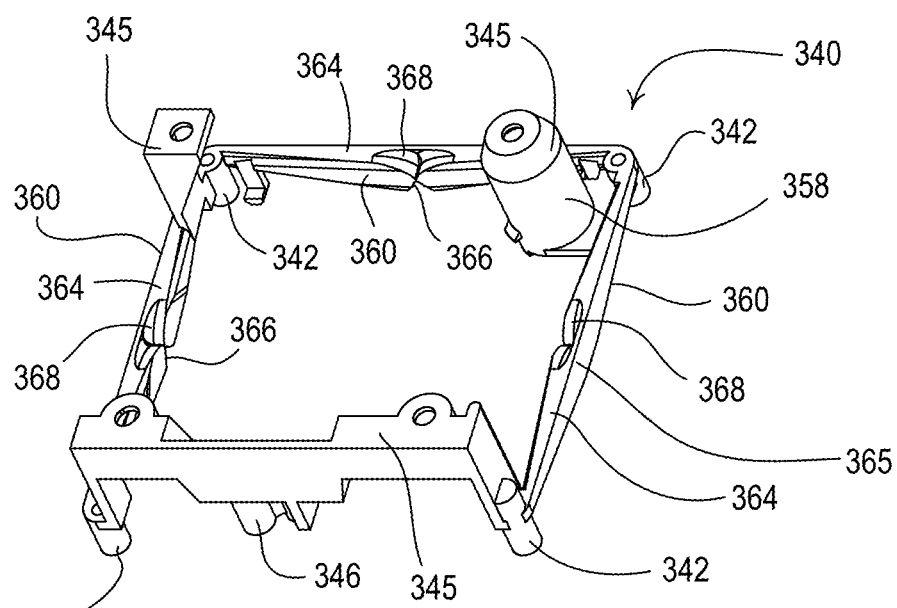
FIG. 6 is a perspective view a multi-functional mounting structure of the wireless control device of FIG. 3.
Figure 7:
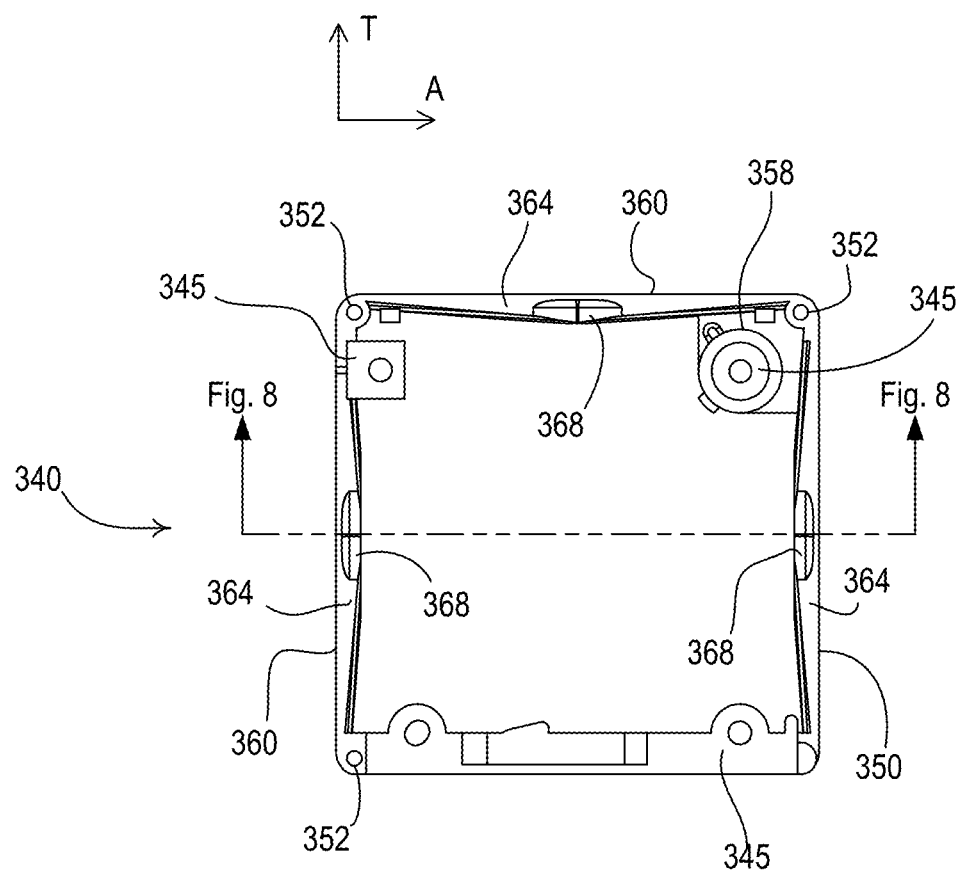
FIG. 7 is a top view of the multi-functional mounting structure of FIG. 6.
Figure 8:
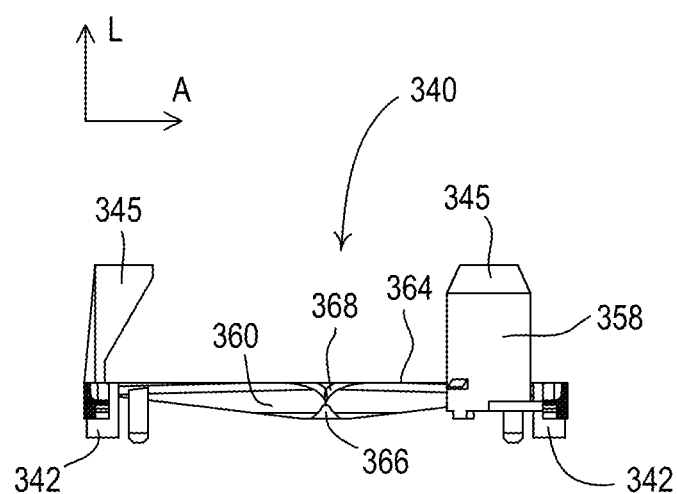
FIG. 8 is a cross-sectional side view of the multi-functional mounting structure of FIG. 6.

The gateway device 300 may further comprise a multi-functional mounting structure 340. FIG. 6 is a perspective view and FIG. 7 is a top view of the multi-functional mounting structure 340. FIG. 8 is a cross-sectional side view of the multi-functional mounting structure 340 taken through the center of the mounting structure as shown in FIG. 7. The multi-functional mounting structure 340 may have four sides that are arranged adjacent the four planar sides 314 of the enclosure. The multi-functional mounting structure 340 may comprise legs 342 that may extend in a longitudinal direction L and may rest on the printed circuit board 330 when the gateway device 300 is assembled. The printed circuit board 330 may be fixedly connected to the multi-functional mounting structure 340 via a screw 344 received through an opening (not shown) in an additional leg 346 (FIG. 6) of the mounting structure. The multi-functional mounting structure 340 may be mounted to the upper portion 310 of the enclosure, for example, via heat stakes (not shown) received through openings in various projections 345 of the multi-functional mounting structure.

The gateway device 300 may further comprise a light diffuser 348 captured between the upper portion 310 and the lower portion 312 of the enclosure when the gateway device 300 is assembled. The light diffuser 348 may be formed as part of the enclosure, e.g., as part of the lower portion 312. The upper portion 310 may be fixedly connected to the lower portion 312 via four screws 350 received through openings 352 (FIG. 7) in the legs 342 of the mounting structure 340. A plurality of rubber pads 354 may be adapted to be placed over openings (not shown) in the lower portion 312 through which the screws 350 extend.

The gateway device 300 may further comprise an antenna 356 (e.g., a helical antenna) that may be a part of a wireless communication circuit mounted on the printed circuit board 330 (e.g., the wireless communication circuit 216 of the gateway device 200 shown in FIG. 2). As shown in FIG. 4, the antenna 356 may comprise an electrical wire wound in the form of a helix. The multi-functional mounting structure 340 may comprise a cylindrical antenna-mounting portion 358 extending along the longitudinal direction L. The antenna 356 may be mounted around the cylindrical antenna-mounting portion 358 of the multi-functional mounting structure 340 in a specific orientation. During manufacturing of the gateway device 300, the antenna 356 may be mounted around the cylindrical structure 358 before the printed circuit board 330 is connected to the mounting structure 340 and the antenna is electrically coupled to the printed circuit board. The cylindrical structure 358 may simplify the assembly process and ensure that the antenna 356 is positioned corrected in the fully-assembled product. The cylindrical structure 358 may also operate as one of the projections 345 for mounting the multi-functional mounting structure 340 to the upper portion 310 of the enclosure.

The gateway device 300 may comprise a three light-emitting diodes (LEDs) 362 for illuminating the light bar 316 along the three respective sides 314 of the enclosure. To provide a uniform distribution of light across the length of the light bar 316 on each side 314 of the enclosure, the gateway device 300 may comprise a respective light-pipe structure for conducting light emitted by each LED 362 to the light bar 316 along the respective side of the enclosure. If the respective light-pipe structure were to extend in a single plane from the LED 362 to the light bar 316, the light-pipe structure would need to be approximately as long as the length of the light bar 316 along the respective side of the enclosure in order to uniformly spread the illumination along the length of the light bar. In other words, to uniformly illuminate the light bar 316 along the front side 314' of the enclosure (which has a length of approximately 2.75 inches), a planar light-pipe structure would need to be approximately 2.75 inches long. Since the four sides 314 of the enclosure have the same length and gateway device 300 comprises many other internal components, a planar light-pipe structure would be unsuitable for use in the gateway device 300 shown in FIGS. 3-8.

Accordingly, the gateway device 300 may further comprise a plurality of complex light-pipe structures 360 for forming the light bar 316 between the upper and lower portions 310, 312 of the enclosure. The light-pipe structures 360 may be formed as part of the multi-functional mounting structure 340 and may surround three sides of the mounting structure 340. Each light-pipe structure 360 may extend for the full width of each side 314 of the enclosure of the gateway device 300 (e.g., in the lateral direction A along the front side 314' or in the transverse direction T along the adjacent sides). Each light pipe structure 360 may comprise a top side 364 adjacent to the light bar 316 along the respective side 314 of the enclosure. Each light-pipe structure 360 may operate to spread the illumination from the adjacent LED 362 along an emitter surface 365 adjacent the top side 364 and thus along the length of the light bar 316 as the light bar extends across the respective side 314 of the enclosure (e.g., in the lateral direction A along the front side 314' or in the transverse direction T along the adjacent sides).

Each LED 362 may be mounted along three respective edges of the printed circuit board 330 at approximately the center of the adjacent light-pipe structure 360. For example, when the printed circuit board 330 is mounted inside of the enclosure, the center of the each LED 362 may be located approximately 0.135 inches from an adjacent inside surface 312' (FIG. 5) of the lower portion 312 of the enclosure (e.g., as measured along the transverse direction T on the front side 314' or along the lateral direction A on the adjacent sides). Each LED 362 may be mounted to the printed circuit board 330 below the respective light-pipe structure 360 and may be configured to emit light in the longitudinal direction L up towards the light-pipe structure. As shown in FIG. 8, each light-pipe structure 360 may comprise a lower recess 366 in which the respective LED 362 on the printed circuit board 330 may be located. The lower recess 366 may be located at the center of the light-pipe structures 360 and may operate as a lens to direct the illumination emitted from the respective LED 362 along the length of the light-pipe structure 360 in both directions away from the LED (e.g., in the lateral direction A along the front side 314' or in the transverse direction T along the adjacent sides). Each light-pipe structure 360 may further comprise an upper recess 368, which may be located above the lower recess 366 and may reflect the illumination (that is not directed by the lower recess 366) along the length of the light-pipe structure 360 in both directions away from the LED (e.g., in the lateral direction A along the front side 314' or in the transverse direction T along the adjacent sides).

Each light-pipe structure 360 may operate to uniformly distribute the light from the respective LED 362 to the emitter surface 365 adjacent the top side 364 of the light-pipe structure. The emitter surfaces 365 may be located on the external sides of light pipe structure 365 (as shown in FIG. 6) and may be, for example, textured to uniformly disperse the illumination. As shown in FIG. 8, each light-pipe structure 360 may get narrower (e.g., narrower in the longitudinal direction L) as the light-pipe structure extends away from the lower recess 366 in the center towards the ends of the light-pipe structure (e.g., in the lateral direction L along the first side 314'). As shown in FIG. 7, each light-pipe structure 360 may also get narrower in the transverse direction T (along the first side 314') and in the lateral direction A (along the adjacent sides) as the light-pipe structure extends away from the lower recess 366 in the center towards the ends of the light-pipe structure. The illumination at the emitter surface 365 adjacent the top side 364 of each light-pipe structure 360 may be conducted through the light diffuser 348 (e.g., through the light diffuser in the transverse direction T on the front side 314' of the enclosure) to form the light bar 316 between the upper portion 310 and the lower portion 312 of the enclosure when the gateway device 300 is fully assembled. The upper recess 368 may also soften the illumination at the emitter surface 365 adjacent the top side 364 of each light-pipe structure 360 immediately above the respective LED 362.

Accordingly, the light pipe structures 360 and the light diffuser 348 may operate to receive light emitted from the LEDs 362 in a first direction (e.g., in the longitudinal direction L), to direct the light along the sides 314 of the enclosure in a second direction (e.g., in the lateral direction A along the first side 314'), and to direct light out from inside of the enclosure in a third direction (e.g., in the transverse direction T through the first side 314') to form the light bar 316 around the enclosure. The light pipe structures 360 and the light diffuser 348 may allow the LEDs 362 to be mounted along the edges of the printed circuit board 330 thus avoiding planar light-pipe structures and saving space inside of the gateway device 300.

Figure 9:
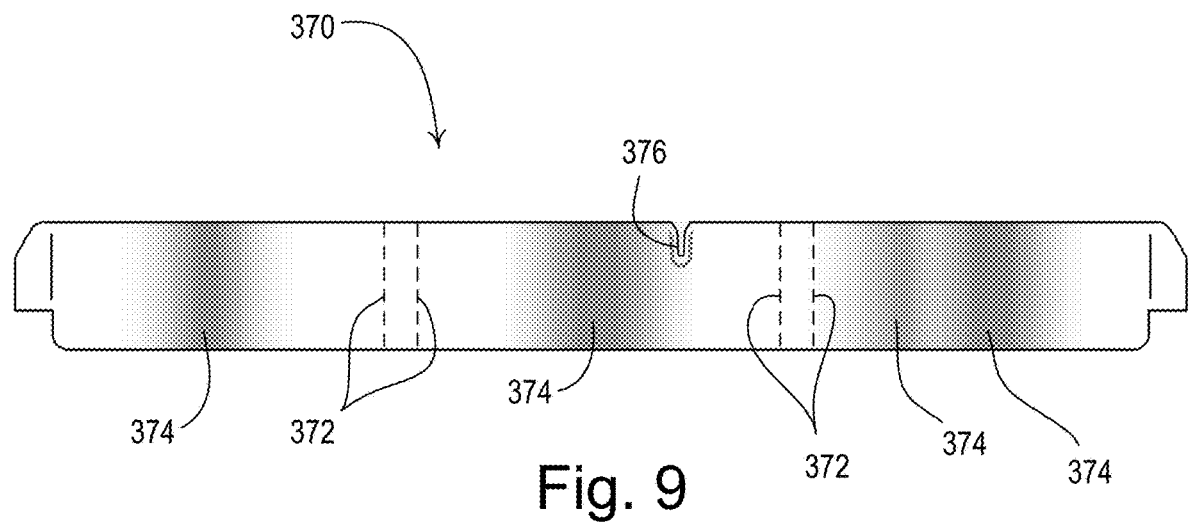
FIG. 9 is a side view of an example diffuser sheet in a flattened state.
Figure 10:
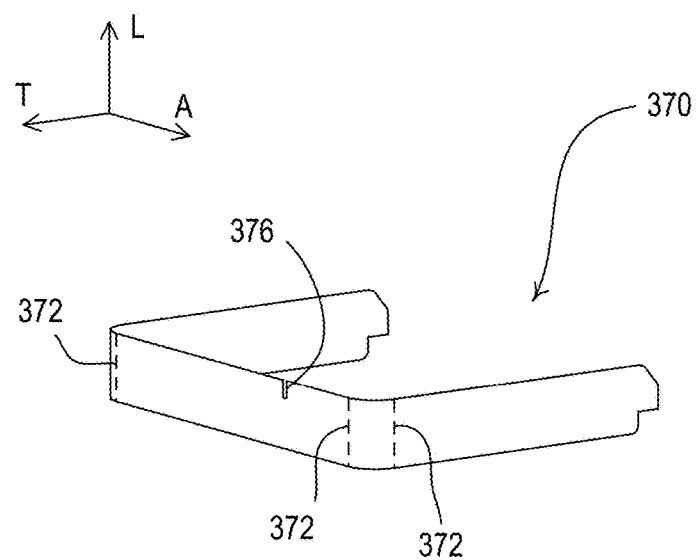
FIG. 10 is a perspective view of the diffuser sheet of FIG. 9 in a folded state.

The gateway device 300 may further comprise an additional diffuser material located between the light diffuser 348 and the light-pipe structures 360 of the multi-functional mounting structure 340. FIG. 9 is a side view of an example diffuser sheet 370 (e.g., a diffuser strip) in a flattened state. FIG. 10 is a perspective view of the diffuser sheet 370 in a folded state. The diffuser sheet 370 may be configured to be folded along lines 372 into the folded state shown in FIG. 10. The diffuser sheet 370 may comprise, for example, strip of clear plastic film that is printed with multiple fade patterns 374. When in the folded state, the diffuser sheet 370 may be located (e.g., slid) between an inner surface 349 of the light diffuser 348 and the light-pipe structures 360 of the multi-functional mounting structure 340 (e.g., in the configuration shown in FIG. 5). The diffuser sheet 370 may comprise a notch 376 that is configured to align with a tab (not shown) in the upper portion 310 of the enclosure.

The diffuser sheet 370 may further balance the intensity of the light bar 316 along the length of the light bar on each of the side 314 of the enclosure to provide to a uniform illumination. When the diffuser sheet 370 is installed in the gateway device 300, the fade patterns 374 may line up with hot spots generated by the light-pipe structures 360, e.g., to attenuate the light conducted to the light diffuser 348 adjacent the hot spots on the light-pipe structures 360. The fade patterns 374 may be located near the locations of the LEDs 362. For example, the multiple fade patterns 374 may each be the same pattern with one fade pattern along each of the sides 314 of the enclosure adjacent the respective LED 362. However, the internal structure of the gateway device 300 may cause the hot spots to be generated at different locations along the light bar 316 on each of the side 314 of the enclosure. For example, the hot spots may be generated on the light bar 316 dues to reflections of light off of the RF shield 332, light being blocked by other structures, and/or differences in the light-pipe structures 360 because of features of the multi-functional mounting structure 340, such as the various projections 345 of the multi-functional mounting structure. Therefore, the multiple fade patterns 374 may be different patterns and may be located at different locations on the diffuser strip 370 along the sides 314 of the enclosure as shown in FIG. 9. In addition, the diffuser strip 370 may comprise multiple fade patterns along each of the sides 314 of the enclosure as shown in FIG. 9.

What is claimed is:

1. A device comprising:
an enclosure having an upper portion, and a lower portion, the lower portion configured to rest on a surface, the enclosure having four sides;
an antenna encased within the enclosure, wherein the antenna comprises a helical antenna configured to communicate wirelessly;
a mounting structure encased within the enclosure and having four sides adjacent to the four sides of the enclosure, the mounting structure comprising a cylindrical portion, wherein the helical antenna is mounted around an outer surface of the cylindrical portion; and
wherein the mounting structure is mechanically coupled to the upper portion of the enclosure.

2. The device of claim 1, further comprising a printed circuit board connected to the mounting structure and housed within the enclosure, wherein the helical antenna is configured to be electrically coupled to the printed circuit board after being mounted around the cylindrical portion of the mounting structure.

3. The device of claim 2, further comprising a light-emitting diode mounted to the printed circuit board.

4. The device of claim 3, wherein the mounting structure comprises a light pipe.

5. The device of claim 4, wherein the light pipe is configured to receive light from the light-emitting diode and emit light in a lateral direction along a side of the enclosure.

6. The device of claim 1, further comprising:
a communication circuit coupled to the helical antenna for receiving wireless communications via the helical antenna; and
a control circuit coupled to the communication circuit, the control circuit configured to receive the wireless communications from the communication circuit.

7. The device of claim 6, wherein the control circuit is further configured to transmit, via the communication circuit and the helical antenna, a load control command to a load control device based on a received message.

8. The device of claim 7, wherein the control circuit is configured to receive the message on a first protocol and to transmit the load control command using a second protocol that is different from the first protocol.

9. The device of claim 8, wherein the first protocol is a Wi-Fi protocol.

10. The device of claim 8, wherein the communication circuit is configured to receive the message from a network device.

11. The device of claim 10, wherein the communication circuit is configured to receive the message via an Internet Protocol packet.

12. The device of claim 11, wherein the network device comprises a smartphone.

13. A method for assembling a device, the method comprising:
   mounting a helical antenna around an outer surface of a cylindrical portion of a mounting structure;
   mounting the mounting structure to an upper portion of an enclosure of the device, wherein the enclosure comprises the upper portion, a lower portion configured to rest on a surface, and four sides, the mounting structure having four sides adjacent to the four sides of the enclosure;
   connecting a printed circuit board to the mounting structure, wherein the mounting structure, antenna, and printed circuit board are configured to be encased within the enclosure; and
   electrically coupling the helical antenna to the printed circuit board after the helical antenna is mounted around the cylindrical portion.

14. The method of claim 13, wherein the mounting structure comprises a light-pipe configured to emit light in a lateral direction along a side of the enclosure.

15. The method of claim 14, wherein connecting the printed circuit board to the mounting structure comprises connecting the printed circuit board to the mounting structure via a screw.

16. The method of claim 15, wherein mounting the mounting structure to the portion of the enclosure comprises mounting the mounting structure to the portion of the enclosure via at least one heat stake received through an opening in the cylindrical portion of the mounting structure.

\* \* \* \* \*